United States Patent [19]

Ross

[11] Patent Number: 4,909,607

[45] Date of Patent: Mar. 20, 1990

[54] ADDRESSING LIQUID CRYSTAL CELLS

[75] Inventor: Peter W. Ross, Stansted, Essex, Great Britain

[73] Assignee: STC PLC, London, England

[21] Appl. No.: 32,759

[22] Filed: Mar. 31, 1987

[30] Foreign Application Priority Data

Apr. 1, 1986 [GB] United Kingdom ................. 8607952

[51] Int. Cl.[4] ........................ G02F 1/13; G09G 3/36; G09G 3/00

[52] U.S. Cl. ................................ 350/350 S; 350/332; 350/333; 340/805; 340/811; 340/784

[58] Field of Search .................... 350/350 S, 332, 333, 350/346, 330, 356; 340/805, 811, 784

[56] References Cited

U.S. PATENT DOCUMENTS

| | | | |
|---|---|---|---|
| 4,048,633 | 9/1977 | Sano | 340/805 |
| 4,413,256 | 11/1983 | Yasuda et al. | 340/805 |
| 4,591,886 | 5/1986 | Umeda et al. | 350/350 S |
| 4,638,310 | 1/1987 | Ayliffe | 350/350 S |

FOREIGN PATENT DOCUMENTS

| | | |
|---|---|---|
| 0137726A | 4/1985 | European Pat. Off. . |
| 0197743A | 10/1986 | European Pat. Off. . |
| 2129182A | 5/1984 | United Kingdom . |
| 2146473A | 4/1985 | United Kingdom . |
| 2173336 | 10/1986 | United Kingdom . |

OTHER PUBLICATIONS

Alta Frequency, vol. 51, No. 3, May/Jun. 1982, pp. 152-158, Milalo It E. Cebi et al.: "A Video Controller for a Liquid Crystal Alphanumeric Panel".

*Primary Examiner*—Stanley D. Miller
*Assistant Examiner*—Trong Quang Phan
*Attorney, Agent, or Firm*—Lee & Smith

[57] ABSTRACT

A method of addressing a matrix addressed ferroelectric liquid crystal cell is described that uses parallel entry of balanced bipolar data pulses on one set of electrodes to co-operate with serial entry of unipolar strobe pulses on the other set of electrodes. The polarity of the strobe pulses is periodically reversed to maintain charge balance in the long term.

9 Claims, 7 Drawing Sheets

ADDRESSING LIQUID CRYSTAL CELLS

BACKGROUND OF THE INVENTION

This invention relates to the addressing of matrix array type ferroelectric liquid crystal cells.

Hitherto dynamic scattering mode liquid crystal cells have been operated using a d.c. drive or an a.c. one, whereas field effect mode liquid crystal devices have generally been operated using an a.c. drive in order to avoid performance impairment problems associated with electrolytic degradation of the liquid crystal layer. Almost all of these devices have employed liquid crystals that do not exhibit ferroelectricity, and the material interacts with an applied electric field by way of an induced dipole. As a result they are not sensitive to the polarity of the applied field, but respond to the applied RMS voltage averaged over approximately one response time at that voltage. There may also be frequency dependence as in the case of so-called two-frequency materials, but this only affects the type of response produced by the applied field.

In contrast to this, a ferroelectric liquid crystal exhibits a permanent electric dipole, and it is this permanent dipole which will interact with an applied electric field. Ferroelectric liquid crystals are of interest in display, switching and information processing applications because they are expected to show a greater coupling with an applied field than that typical of a liquid crystal that relies on coupling with an induced dipole, and hence ferroelectric liquid crystals are expected to show a faster response. A ferroelectric liquid crystal display mode is described for instance by N. A. Clark et al in a paper entitled 'Ferro-electric Liquid Crystal Electro-Optics Using the Surface Stabilized Structure' appearing in Mol. Cryst. Liq. Cryst. 1983 Volume 94 pages 213 to 234.

A particularly significant characteristic peculiar to ferroelectric smectic cells is the fact that they, unlike other types of liquid crystal cell, are responsive differently according to the polarity of the applied field. This characteristic sets the choice of a suitable matrix-addressed driving system for a ferroelectric smectic into a class of its own. A further factor which can be significant is that, in the region of switching times of the order of a microsecond, a ferroelectric smectic typically exhibits a relatively weak dependence of its switching time upon switching voltage. In this region the switching time of a ferroelectric may typically exhibit a response time proportional to the inverse square of applied voltage or, even worse, proportional to the inverse single power of voltage. In contrast to this, a (non-erroelectric) smectic A device, which in certain other respects is a comparable device, exhibits in a corresponding region of switching speeds a response time that is typically proportional to the inverse fifth power of voltage. The significance of this difference becomes apparent when it is appreciated first that there is voltage threshold beneath which a signal will never produce switching however long that signal is maintained; second that for any chosen voltage level above this voltage threshold there is a minimum time $t_S$ for which the signal has to be maintained to effect switching; and third that at this chosen voltage level there is a shorter minimum time $t_P$ beneath which the application of the signal voltage produces no persistent effect, but above which, upon removal of the signal voltage, the liquid crystal does not revert fully to the state subsisting before the signal was applied. When the relationship $t_S=f(V)$ between V and $t_S$ is known, a working guide to the relationship between V and $t_P$ is often found to be given by the curve $t_P=g(V)$ formed by plotting $(V_1,t_2)$ where the points $(V_1,t_1$ and $V_2,t_2)$ lie on the $t_S=f(V)$ curve, and where $t_1=10t_2$. Now the ratio of $V_2/V_1$ is increased as the inverse dependence of switching time upon applied voltage weakens, and hence, when the working guide is applicable, a consequence of weakened dependence is an increased intolerance of the system to the incidence of wrong polarity signals to any pixel, that is signals tending to switch to the '1' state a pixel intended to be left in the '0' state, or to switch to the '0' state a pixel intended to be left in the '1' state.

Therefore, a good drive scheme for addressing a ferroelectric liquid crystal cell must take account of polarity, and may also need to take particular care to minimise the incidence of wrong polarity signals to any given pixel whether it is intended as '1' state pixel or a '0' state one. Additionally, the waveforms applied to the individual electrodes by which the pixels are addressed need to be charge-balanced, at least in the long term. If the electrodes are not insulated from the liquid crystal, this is so as to avoid electrolytic degradation of the liquid crystal brought about by a net flow of direct current through the liquid crystal. On the other hand, if the electrodes are insulated, it is to prevent a cumulative build up of charge at the interface between the liquid crystal and the insulation.

SUMMARY OF THE INVENTION

A primary object of the present invention concerns the provision of an addressing method for driving a ferroelectric liquid crystal cell in a manner that takes account of polarity requirements, of minimising the incidence of wrong polarity signals, and of preserving long term charge balance. In achieving this object use is made of a combination of unipolar and bipolar pulses. For the purposes of this specification a unipolar pulse is defined to mean a pulse in which, neglecting any unintended overshoot effects, the voltage makes a single excursion either positively or negatively from its rest value; similarly a bipolar pulse is defined to mean a pulse in which, neglecting any unintended overshoot effects, the voltage makes a first excursion either positively or negatively from its rest value and then makes an oppositely directed second excursion the other side of the rest value.

According to the present invention there is provided a method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, in which method the pixels are selectively addressed on a line-by-line basis by the application of unipolar strobing pulses serially to the members of the first set of electrodes while charge balanced bipolar data pulses are applied in parallel to the members of the second set, the positive going parts of the bipolar data pulses being synchronised with a strobe pulse for one data significance and the negative going arts being synchronised with the strobe pulse for the other data significance, wherein the pixels of both data significance are set into their correct states by said line-by-line addressing by first setting the pixels of one data significance into their correct state using unipolar strobe pulses of one polarity type and then setting the pixels of the other data significance into their correct state using unipolar strobe pulses of the opposite polarity type.

BRIEF DESCRIPTION OF THE DRAWINGS

There follows a description of a ferroelectric liquid crystal cell and of a number of methods by which it may be addressed. The first three of these methods have been included for he purposes of comparison, while the fourth and subsequent methods embody the present invention in preferred forms. The first method is as described by T. Harada et al in 'An Application of Chiral Smectic-C Liquid Crystal to a Multiplexed Large-Area Display', Society for Information Display (SID) 85 Digest pages 131 to 134. The second method is one of the methods described in UK Patent Specification No. 2146473A. The third is one of the methods described in the specification of UK Patent Specification No. 2173336A. The description refers to the accompanying drawings in which.

DETAILED DESCRIPTION OF PREFERRED EMBODIMENT

Figure 1:
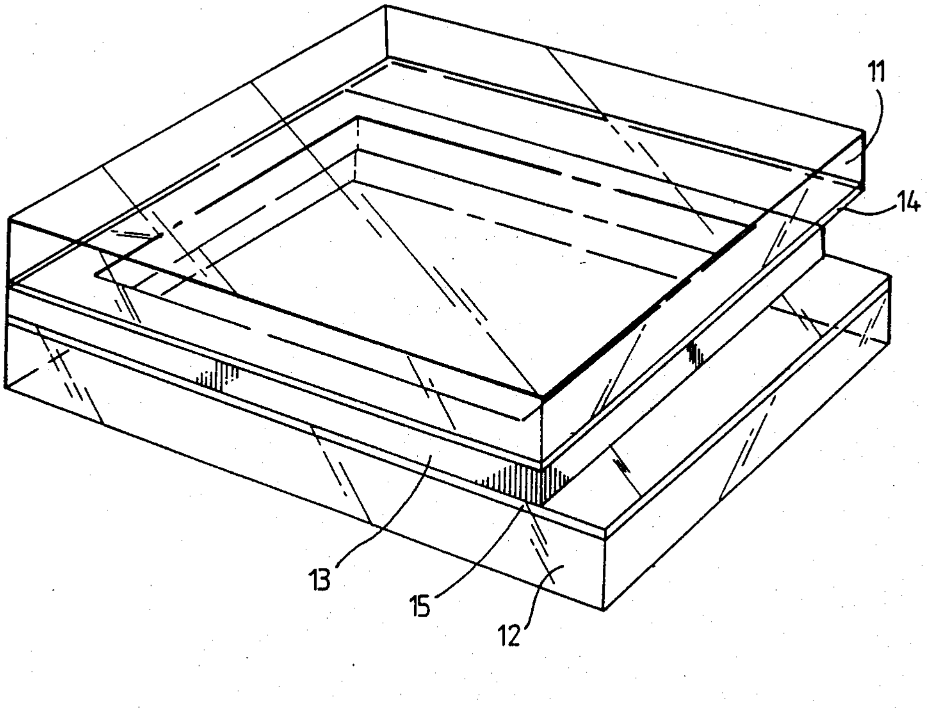
FIG. 1 depicts a schematic perspective view of a ferroelectric liquid crystal cell.

Referring now to FIG. 1, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and one or sometimes both of these electrode layers is covered within the display area defined by the perimeter seal with a polymer layer, such as nylon (not shown), provided for molecular alignment purposes. The nylon layer is rubbed in a single direction so that, when a liquid crystal is brought into contact with it, it will tend to promote planar alignment of the liquid crystal molecules in the direction of the rubbing. If the cell has polymer layers on both its inward facing major surfaces, it is assembled with the rubbing directions aligned parallel with each other. Before the electrode layers 14 and 15 are covered with the polymer, each one is patterned to define a set of strip electrodes (not shown) that individually extend across the display area and on out to beyond the perimeter seal to provide contact areas to which terminal connection may be made. In the assembled cell the electrode strips of layer 14 extend transversely of those of layer 15 so as to define a pixel at each elemental area where an electrode strip of layer 15 is overlapped by a strip of layer 14. The thickness of the liquid crystal layer contained within the resulting envelope is determined by the thickness of the perimeter seal, and control over the precision of this may be provided by a light scattering of polishing grit particles of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the to apertures are sealed.) The filling operation is carried out with the filling material heated into its isotropic phase as to reduce its viscosity to a suitably low value. It will be noted that the basic construction of the cell is similar to that of for instance a conventional twisted nematic, except of course for the parallel alignment of the rubbing directions.

Typically the thickness of the perimeter seal 13, and hence of the liquid crystal layer, is between 2 and 10 microns, but thinner or thicker layer thicknesses may be required to suit particular applications depending for instance upon whether the layer is to be operated in the $S_C^*$ phase or in one of the more ordered phases such as $S_I^*$ or $S_F^*$.

Figure 2:
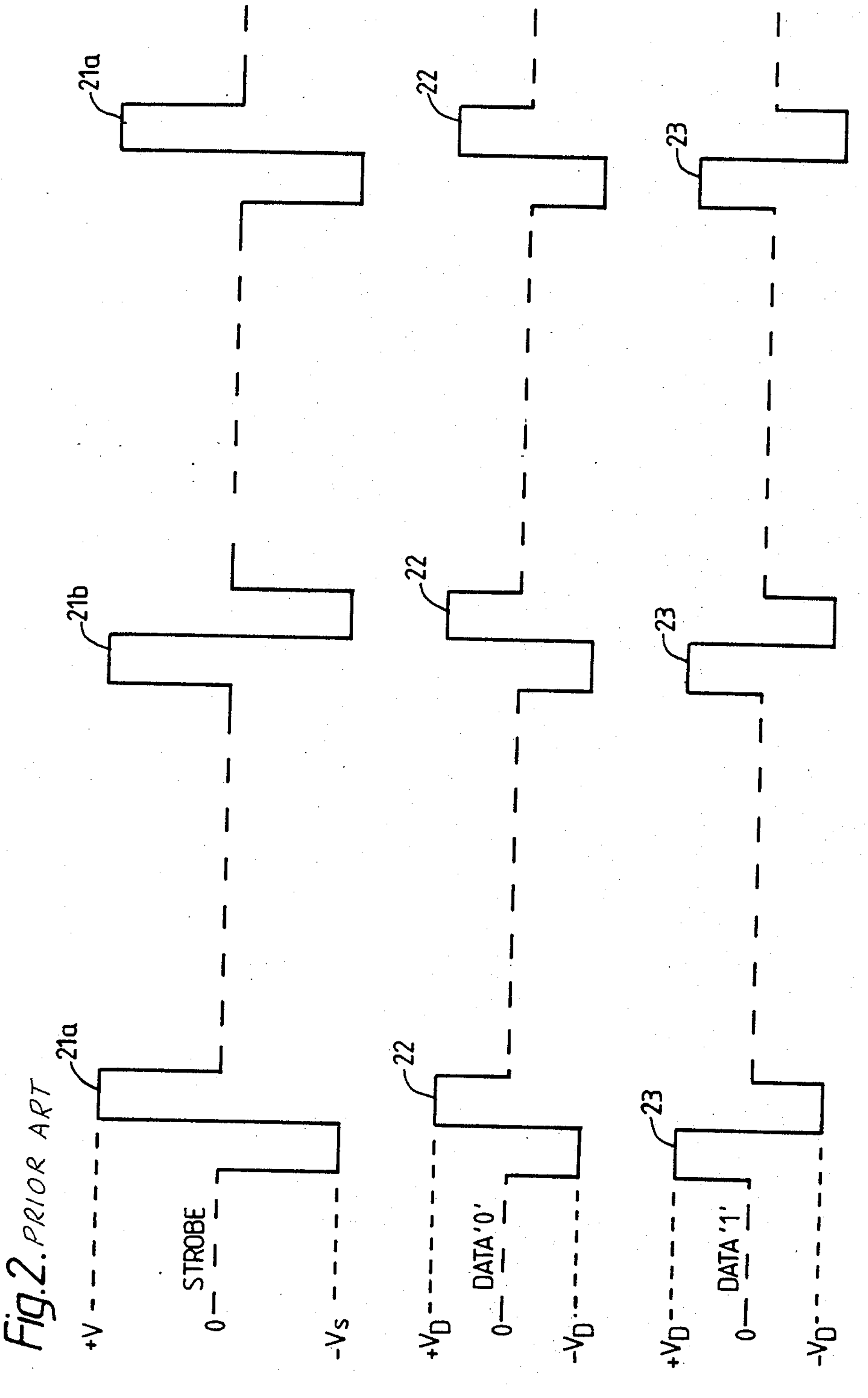
Fig.2. PRIOR ART
FIG. 2, 3 and 4 depict the waveforms of drive schemes as previously described respectively in SID 85 Digest, in UK Patent Application No. 2146473A, and in the specification of UK Patent Specification No. 2173336A.

The waveforms of a drive scheme disclosed in the above-referenced publication of T. Harada et al are illustrated in FIG. 2. This employs bipolar data '0' pulse 22 and data '1' pulses 23 to co-act with bipolar strobe pulses **21*a* and 21*b*. Each bipolar data pulse involves excursions to $+V_D$ and to $-V_D$, each for a duration $t_S$. Similarly, each bipolar strobe pulse involves excursions to $+V_S$ and $-V_S$, also each for a duration $t_S$. Strobe pulse 21*a* are applied serially to the electrode strips of one electrode layer (14 or 15), while the data pulses 22 and 23 are applied in parallel to those of the other layer. This is repeated for the next field, but in this instance strobe pulses 21*b* are used in place of strobe pulses 21*a*. Thus alternate fields employ strobe pulses 21*a* while the intervening fields employ strobe pulses 21*b***.

A pixel is exposed to voltages of $+V_D$ and $-V_D$ all the time it is not being addressed by any strobe pulse, and the magnitude of $V_D$ is chosen so that this will be insufficient to effect switching of that pixel from either state to the other. If that pixel is simultaneously addressed with a strobe pulse **21*a* and a data '0' pulse 22, it will be exposed first to a voltage $(V_S-V_D)$ for duration $t_S$, and then to a voltage $-(V_S-V_D)$ for a further duration $t_S$. The magnitude of $V_S$ is chosen in relation to $V_D$ so that this voltage exposure is also insufficient to switch the pixel. On the other hand, if the pixel is simultaneously addressed with a strobe pulse 21*b* and a data '0' pulse 22, it will be exposed first to a voltage $(V_S+V_D)$ for a duration $t_S$, and then immediately after, to a voltage $-(V_S+V_D)$, also for a duration $t_S$. The magnitudes of the voltages $V_S$ and $V_D$ are chosen so that this voltage exposure is sufficient to switch the pixel first to its '1' state, and then immediately back to its '0' state. Similarly, a coincidence of a strobe pulse 21*a* and a data '1' pulse will switch a pixel first into the data '0' state, and then immediately back into the data '1' state, whereas the coincidence of a strobe pulse 20*b*** and a data '1' pulse will effect no switching.

A significant drawback of these switching waveforms is that they involve switching a pixel to the wrong state immediately before switching it to the right one, and when attempting to switch at conventional video frame rates this require a switching voltage $|V_S+V_D|$ that is significantly greater by a factor, which in some circumstances is as large as two, than that required for switching in only one direction at a time.

Figure 3:
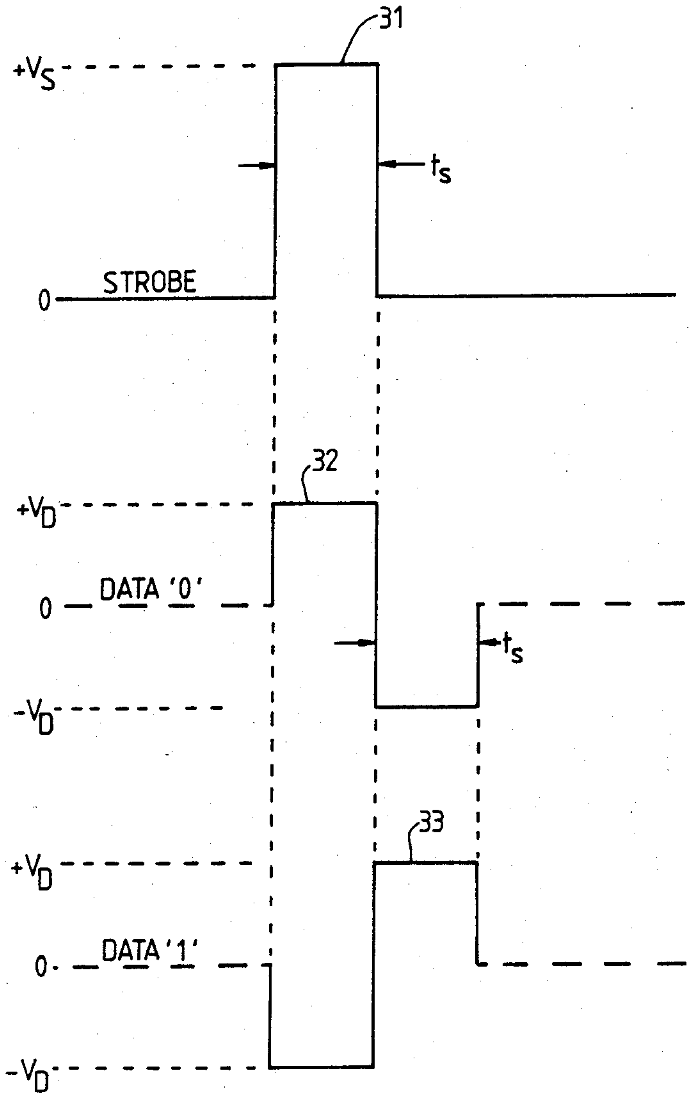
Fig. 3. PRIOR ART

Some drive schemes for ferroelectric cells are also described in UK Patent Specification No. 2146473A. Among these is a scheme that is described with particular reference to FIG. 1 of that specification, a part of which has been reproduced herein in slightly modified form as FIG. 3. This employs bipolar data pulses 32, 33 to co-act with unipolar strobe pulses 31. The strobe pulses 31 are applied suerially to the electrode strips of one electrode layer, while the data pulses 32, and 33 are applied in parallel to those of the other layer. In this particular scheme the unipolar nature of the strobe pulses dictates that pixels are capable of being switched by these pulses in one direction only. Accordingly, some form of blanking is required between consecutive addressings of any pixel. In the description it is suggested that this take the form of a pulse (not shown) applied to the strobe line which is of opposite polarity to that of the strobe pulses.

A pixel is switched on by the coincidence of a voltage excursion of $V_S$, of duration $t_S$, on its strobe line with a voltage excursion of $-V_D$, for an equal duration, on its data line. These two voltage excursions combine to produce a switching voltage of $(V_S+V_D)$ for a duration $t_S$. Since the switching voltage threshold for duration $t_S$ is close to $(V_S+V_D)$, a blanking pulse applied to the strobe lines without any corresponding voltage excursion on the data lines will not be sufficient to achieve the requisite blanking if it is of amplitude $V_S$ and duration $t_S$. Therefore, if no voltage is to be applied to the data lines, the amplitude of the blanking pulse must be increased to $(V_S+V_D)$, or its duration must be extended beyond $t_S$. Both these options have the effect of removing charge balance from the strobe lines.

Figure 4:
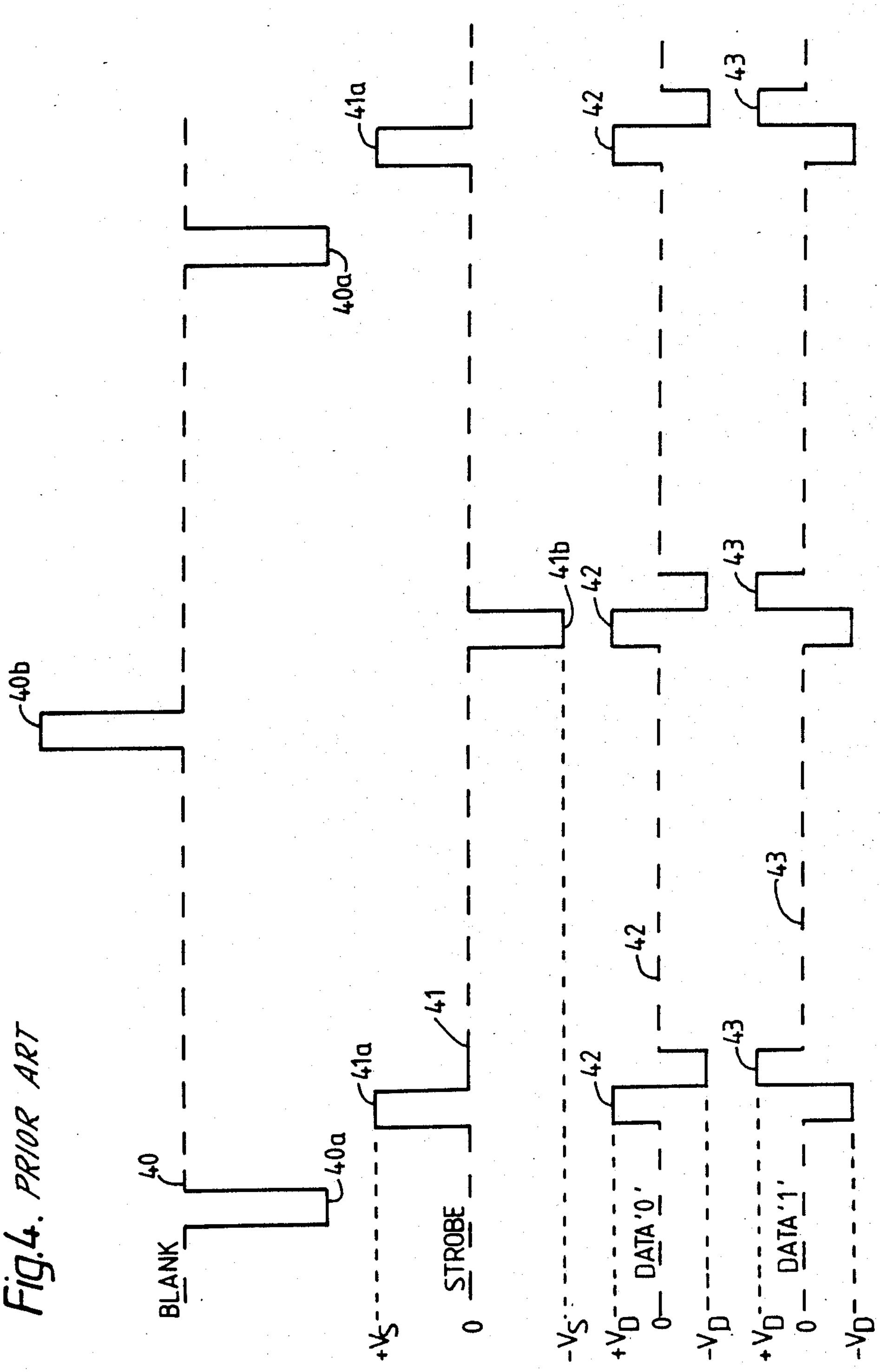
Fig.4. PRIOR ART

Attention will now be turned to FIG. 4 which depicts waveforms according to one of the addressing schemes described in the specification of UK Patent Specification No. 2173336A. Blanking, strobing, data '0' and data '1' waveforms are depicted respectively at 40, 41, 42 and 43.

As before, the data pulse waveforms are applied in parallel to the electrode strips of one of the electrode layers 14, 15, while strobe pulses are applied serially to those of the other electrode layer. The blanking pulses are applied to the set of electrode strips to which the strobe pulses are applied. These blanking pulses may be applied to each electrode strip in turn, to selected groups in turn, or to all strips at once according to specific blanking requirements.

The data pulses 42 and 43 are balanced bipolar pulses, each having positive and negative going excursions of magnitude $|V_D|$ and duration $t_S$ to give a total duration $2t_S$. If the operating constraints allow consecutive lines to be addressed without interruption, then unaddressed pixels receiving consecutive data pulses may see a data 1 followed immediately by a data '0', or alternatively a data '0' followed immediately by a data '1'. In either instance the liquid crystal layer at such a pixel will be exposed to a potential difference of $V_D$ for a period of $2t_S$. Therefore, the magnitude of $V_D$ must be set so that this is insufficient to effect switching from either data state to the other.

The first illustrated strobe pulse 41*a* is a positive going unipolar pulse of amplitude $V_S$ and duration $t_S$. All strobe pulses are synchronised with the first half of their corresponding data pulses. (They could alternatively have been synchronised with the second halves, in which case the data significance of the data pulse waveforms is reversed.) The liquid crystal layer at each pixel addressed by that data pulse will, for the duration of that strobe pulse, be exposed to a potential difference of $(V_S-V_D)$ if that pixel is simultaneously addressed with a data '0' waveform, or a potential difference of $(V_S+V_D)$ if it is simultaneously addressed with a data '1' waveform. The magnitudes of $V_S$ and $V_D$ are chosen so that $(V_S+V_D)$ applied for a duration $t_S$ is sufficient to effect switching, but $(V_S-V_D)$, and $V_D$, both for a similar duration $t_S$, are not.

The data pulses are thus seen to be able to switch the pixels in one direction only, and hence, before they are addressed, they need to be set to the other state by means of blanking pulses 40. The blanking pulse preceding any strobing pulse needs to be of the opposite polarity to that of the strobing pulse. Thus positive going strobe pulses 41*a* are preceded by negative going blanking pulses 40*a*, while negative going strobe pulses 41*b* are preceded by positive going blanking pulses 40*b*. Each blanking pulse is of sufficient amplitude and duration to set the electrode strip or strips to which it is applied into data *'0'* or *'1'* state as dictated by polarity. It may for instance be of magnitude $|V_S+V_D|$ and duration $t_S$, but a shorter or longer duration pulse, with correspondingly increased or reduced amplitude, may be preferred to suit specific requirements.

The first blanking pulse of FIG. 4 is a negative going pulse which sets the pixels to which it is applied into the data '0' state. With this addressing scheme, if the blanking pulse is applied to only one electrode strip, then a fresh blanking pulse will be required before the next strip is addressed with a strobing pulse, whereas if the blanking pulse is applied in parallel to group of electrode strips, or to the whole set of electrode strips of that electrode layer 14 or 15, then each one of the strips which have been blanked can be serially addressed once with an individual strobe pulse before the next blanking pulse is required. Periodically the polarity of the blanking pulse is reversed, directly after which the polarity of the succeeding strobe pulse or pulses is also reversed. The specification suggests that such polarity reversals may occur with each consecutive blanking of any given electrode strip, or such a strip may receive a small number of blanking pulses and addressings with strobe pulses before it is subject to a polarity reversal. It states that the periodic polarity reversals may be effected on a regular basis with a set number of addressings between each reversal, or it may be on a random basis, and suggests that a random basis is indicated for instance when the blanking pulses are applied to elected groups of strips, and a facility is provided that enables the sizes of those groups to be changed in the course of data refreshing. These polarity reversals ensure that in the course of time each strip is individually addressed with equal numbers of positive going and negative going blanking pulses. A consequence of this is that each strip also addressed with equal number of positive going and negative going strobe pulses. Hence over a period of several addressings charge balance is maintained.

With this addressing scheme, as illustrated in FIG. 4, any single addressing of a pixel can set that pixel from one of its two states to the other state, but it cannot be used to set that pixel into the other state, and hence the pixels are blanked before each addressing in order to enable that single addressing to achieve the setting of all the pixels into their required states. This is clearly important in any addressing scheme for a display exhibiting long term storage which it is intended to refresh only occasionally with a single addressing. The position is however different in respect of a display which is being continuously refreshed, for instance at conventional video frame rate. Under these circumstances, if the polarity of the strobe is changed with each field any pixel that cannot be set into its correct state in one field will be capable of being set into that state in the next. The frequency with which fields are refreshed, means that for most situations the dwell time of pixel in the wrong state before being set into right one is sufficiently small to be entirely acceptable.

A preferred embodiment of addressing scheme according to the present invention therefore employs the strobe and data pulse waveforms 51*a*, 51*b*, 52 and 53. These waveforms are identical with the corresponding strobe and data pulse waveforms 41*a*, 41*b*, 42 and 43 of FIG. 4, but there is no corresponding blanking pulse waveform in the addressing scheme of FIG. 5. The first halves of the data pulses are represented as being synchronised with the strobe pulses 51*a*, 51*b*, but alternatively it can be the second halves of those data pulses that are synchronised with the strobe pulses, in which case the data significance of the waveforms 52 and 53 is reversed.

Figure 5:
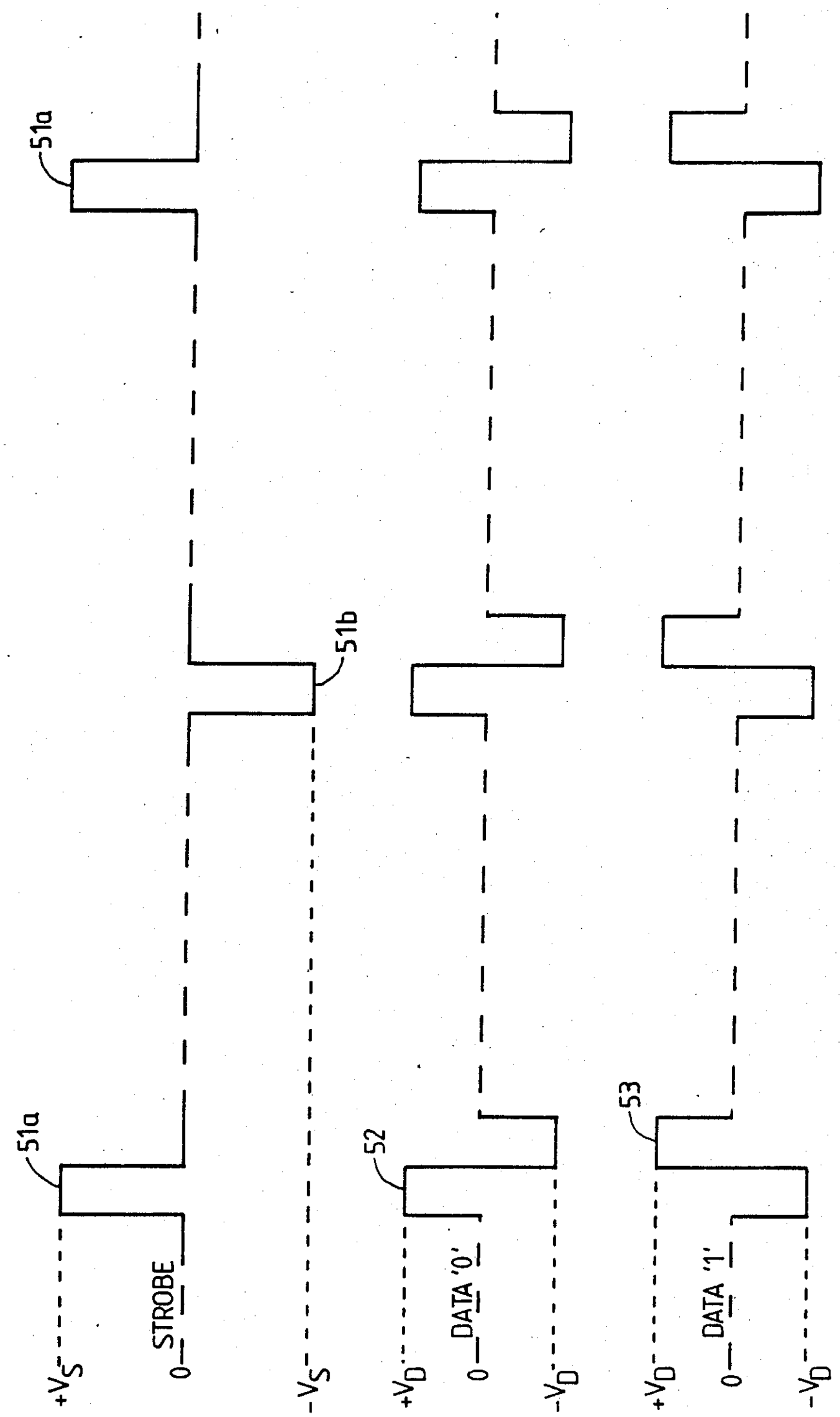
FIGS. 5 to 7 depict the waveforms of three alternative drive schemes embodying the present invention in preferred forms.

The addressing scheme of FIG. 5 is designed primarily for the situation where the polarity of the strobe pulses is changed with each refreshing of the cell, but it should be appreciated that if for some reason it is desired to provide a slightly longer interval between polarity reversals (occupying a small number of refreshings), this addressing scheme can still be employed, though it will be evident that this will entail the possibility of certain of the pixels being retained in their wrong states for correspondingly longer periods before being set into their correct states. It will also be appreciated that the scheme can be used in an intermittently addressed mode that makes use of storage properties of the cell. In this instance, the intermittent operation will have to be arranged such that each updating includes at least two refreshings in quick succession, one of which is accomplished with at least one field of strobe pulses of one polarity, and another of which is accomplished with strobe pulses of the other polarity.

The addressing scheme of FIG. 5 provides a line address time of $2t_S$ for a switching voltage of $(V_S+V_D)$ which affords an improvement in line address time and/or minimum switching voltage requirements over that afforded by the addressing scheme of FIG. 2 because the FIG. 5 scheme avoids having the switching field preceded immediately with the application of the reverse of equal magnitude. The scheme of FIG. 5 does however, leave the pixel exposed to non-zero voltages both immediately before and immediately after the switching voltage.

Figure 6:
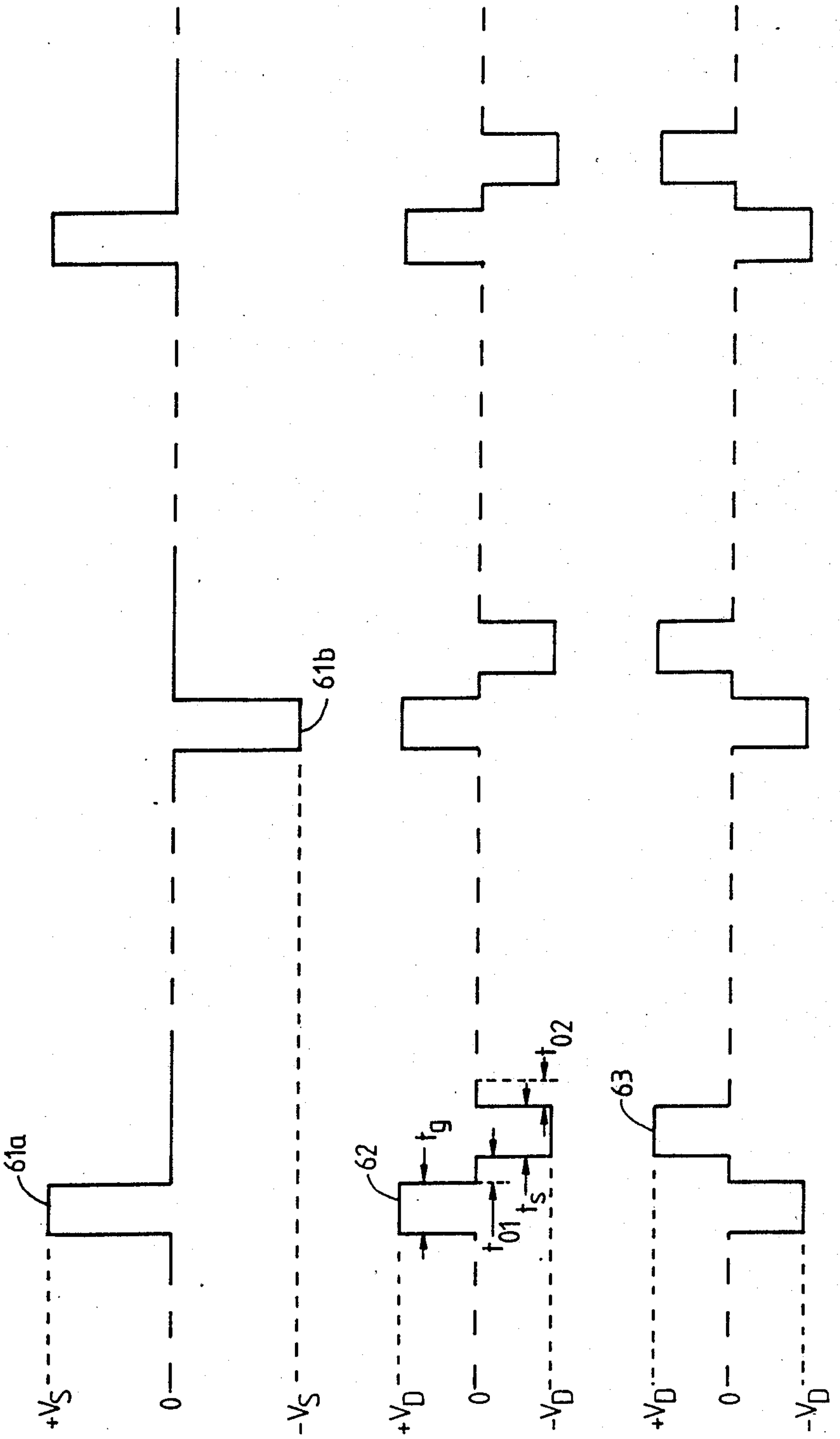

If the FIG. 5 addressing scheme is operated with the first halves of the data pulses synchronised with the strobe pulses then a switching voltage is always immediately followed by a reverse bias of $V_D$, whereas the voltage that immediately precedes the switching voltage, though also of magnitude $V_D$, may be a forward bias or a reverse bias depending upon the data entry for the preceding row. Under some conditions the switching criteria can be somewhat relaxed by modifying the waveforms to provide zero voltage gaps which operate to prevent switching voltage stimulus from being immediately preceded or immediately followed by a stimulus of the opposite polarity. A zero voltage gap of duration $t_{01}$ between the two halves of the data pulse waveforms 62 and 63 as depicted in FIG. 6 ensures that the switching stimulus is not immediately followed by a reverse polarity stimulus, while a zero voltage gap of duration $t_{02}$ between consecutive data pulse ensures that the switching stimulus is never immediately preceded by a reverse polarity stimulus. In all other respects the waveforms of FIG. 6 are the same as those of FIG. 5. The corresponding strobe pulse waveform 61 still has its leading and trailing edges synchronised with the leading and trailing edges of the voltage excursions of the data pulse waveforms that immediately recede the zero voltage gaps to $t_{01}$. It should be noted, however, that any relaxation of the switching criteria afforded by this introduction of the zero voltage gaps $t_{01}$ and $t_{02}$ is achieved at the expense of increasing the line address time from $2t_S$ to $(2t_S+t_{01}+t_{02})$. The durations of $t_{01}$ and $t_{02}$ maybe the same, but are not necessarily so. If the second voltage excursions of the data pulse waveforms are synchronised with the strobe pulses rather than the first voltage excursions, then the respective rôles of the zero voltage gaps $t_{01}$ and $t_{02}$ are reversed.

Figure 7:
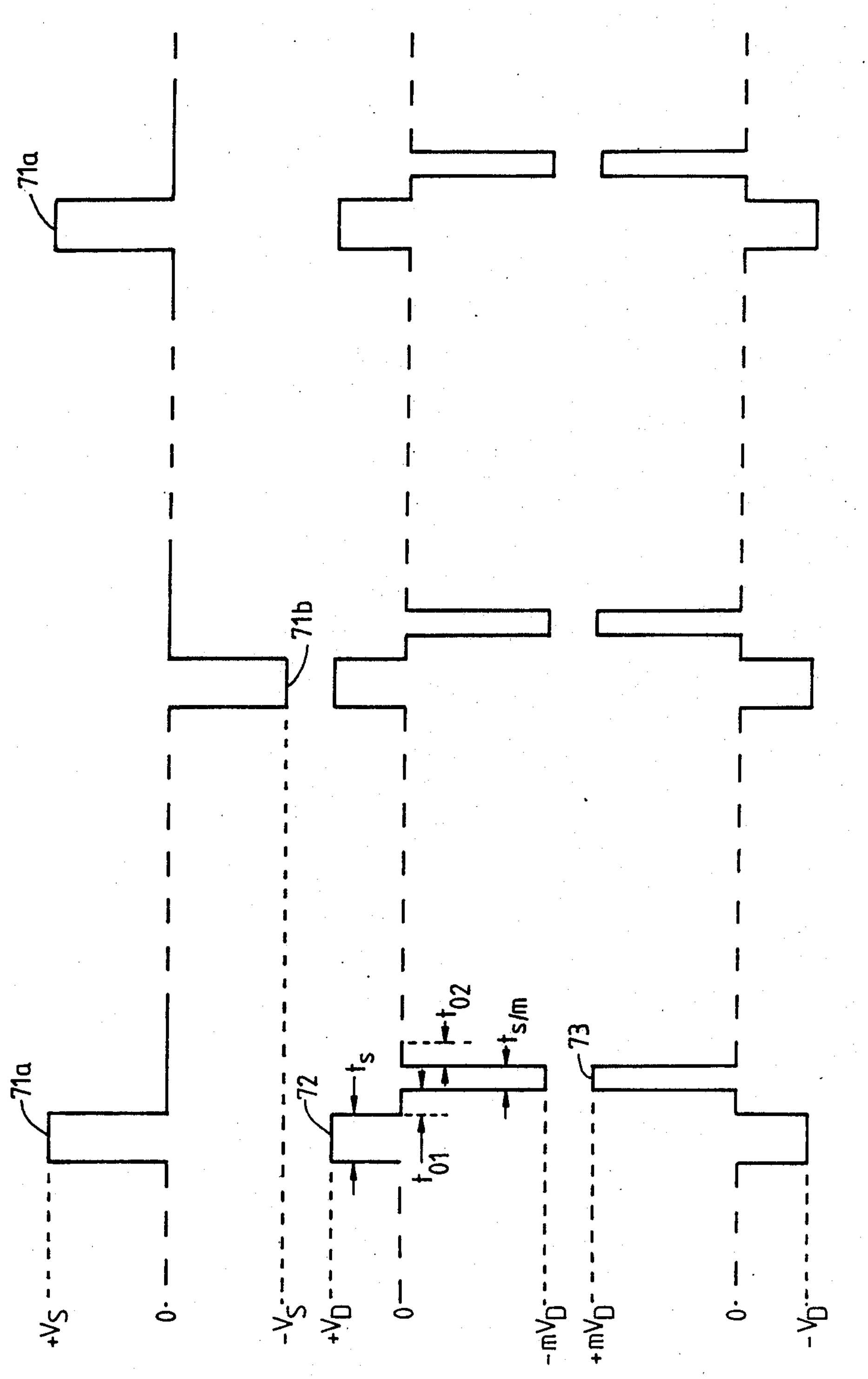

The bipolar data pulse waveforms so far depicted have been not only charge-balanced but also symmetrical with regard to the extend of voltage excursion. Examination of the switching characteristics of certain ferroelectric cells has revealed however, that in some circumstances it can be advantageous, so far as line switching time is concerned, to depart from the symmetry condition whist retaining charge balance. The addressing scheme of FIG. 7 is derived from that of FIG. 6 and is distinguished from the earlier scheme by the use of data pulse waveforms that are asymmetric as regards the extent of voltage excursion. The modified data '0' and data '1' waveforms are depicted respectively at 72 and 73 in FIG. 7. The parts of those waveforms before the zero voltage gaps $t_{01}$ are unchanged. As before, they are synchronised with the strobe pulses of magnitude $|V_S|$ and duration $t_S$ and are themselves of magnitude $|V_D|$ and duration $t_S$. For each type of data pulse waveform the voltage excursion after the zero voltage gap $t_{01}$ is m times that of the first part, but charge balance is restored by reducing he duration of the second part by a factor m in relation to the duration of the first. The factor m is typically not more than 3. In comparison with the addressing scheme of FIG. 6 the line address time is reduced by the use of these asymmetric waveforms from $(2t_S+t_{01}+t_{02})$ to $(t_S+t_{S/m}+t_{01}+t_{02})$

I claim:

1. A method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, in which method the pixels are selectively addressed on a line-by-line basis by the application of unipolar strobing pulses serially to the members of the first set of electrodes while charge balanced bipolar data pulses are applied in parallel to the members of the second set, the positive going parts of the bipolar data pulses being synchronised with a strobe pulse for one data significance and the negative going parts being synchronized with the strobe pulse for the other data significance, wherein the pixels of both data significance are set into their correct states by said line-by-line addressing by first setting the pixels of one data significance into their correct state using unipolar strobe pulses of one polarity type and then setting the pixels of the other data significance into their correct state using unipolar strobe pulses of the opposite polarity type.

2. A method as claimed in claim 1, wherein in respect of each member of said first set of electrodes the polarity of each unipolar strobe pulse applied to that member is the opposite of that of the immediately preceding unipolar strobe pulse applied to that member.

3. A method as claimed in claim 1, wherein a gap separates the positive and negative going portions of each balanced bipolar data pulse.

4. A method as claimed in claim 1, wherein a gap always precedes or follows each balanced bipolar data pulse.

5. A method as claimed in claim 1, wherein the positive and negative going portions of each balanced bipolar data pulse are asymmetric, one part having m times the amplitude of the other and $1/m^{th}$ the duration.

6. A method as claimed in claim 5, wherein a gap separates the positive and negative going portions of each balanced bipolar data pulse.

7. A method as claimed in claim 5, wherein a gap always precedes or follows each balanced bipolar data pulse.

8. A method as claimed in claim 7, wherein a gap separates the positive and negative going portions of each balanced bipolar data pulse.

9. A method as claimed in claim 1, wherein a gap separates the positive and negative going portions of each balanced bipolar data pulse and a gap always precedes or follows each such data pulse.

* * * * *